Patented Sept. 12, 1933

1,926,185

UNITED STATES PATENT OFFICE 1,926,185

PROCESS OF CANNING SCRAPPLE

Frederick A. Vogt, Philadelphia, Pa.

No Drawing. Application May 27, 1930
Serial No. 456,308

6 Claims. (Cl. 99—8)

This invention relates to a new and useful process for canning scrapple, whereby, a product is provided that may be kept indefinitely and whereby the quality of the scrapple is improved by the mode of effecting the canning thereof.

Heretofore scrapple, which is a combined meat and vegetable product, has generally been prepared by cooking the mixed constituents thereof to completion in open vessels. The scrapple is put on the market, either by supplying the retailers with open pans filled wherewith, or by molding the scrapple in smaller pans, and wrapping the molded product in individual packages that may be sold in wrapped form to the consumer. Scrapple marketed in either of the ways just stated is capable of being kept only a relatively short period of time and substantial losses in flavor of the scrapple result due to the fact that the product is cooked in open containers so that inherent flavor of the constituents are driven off to a certain degree with volatile oils and gases arising from the scrapple during the cooking thereof.

Attempts have heretofore been made to can scrapple, because of the inherent advantages of the marketing thereof in this form, by cooking the same in the cans, but openings or vent holes were maintained in the top of the can until the cooking thereof was completed with the result that certain of the elements of the constituents, that form the scrapple, were given off during the cooking in the form of gases or vapors with a loss of flavor in the product.

Difficulties also arose in prior attempts to can scrapple due to the fact that the combination of constituents, that form the scrapple reacted chemically on the metal of the cans, producing a blackening of the inside of the can that made the product anything but appetizing, in spite of the fact that such chemical reactions did not result in anything that was injurious to the health of consumers. The blackened appearance however prevented the sale of the canned scrapple.

I have discovered that the chemical reactions, just referred to, can be entirely avoided by coating the interior of the cans, in which scrapple is to be marketed, with an enamel serving to protect the metal of the walls from direct contact with the scrapple in the can.

I have found further that it is practicable to prepare scrapple for canning in cans of this character with improved results by cooking the scrapple only partially, that is, to the extent of securing homogeneous mixture of the constituents before filling the cans therewith, and that the flavor of the product is improved by completing the cooking operation after the can has been sealed so as to prevent the escape of volatile liquids and other products during the completion of the cooking operation. A canned product of high grade is thus obtained that can be kept indefinitely.

In carrying out this process the scrapple ingredients are combined in the usual manner. A preferred formula for scrapple includes 530 pounds of pork; 6 pounds rye flour; and 100 pounds corn meal. The meal is cut to reduce it to comminuted form and a sufficient quantity of water is added to make a good juicy consomme. The rye flour is added to the mixture, and the corn meal is preferably combined therewith in small quantities at a time. Such meal may be added to the mixture at intervals, preferably, in batches of 10 pounds each, while the mixture is boiling and being agitated by the stirrer ordinarily provided in the kettle used for the purpose of cooking scrapple.

Before adding the meal or flour the meat is preferably cooked for one and one-half hours, and after the corn meal is added the same is cooked for an additional hour or an hour and a half, until the mixture assumes a homogeneous form and begins to thicken. At this point the temperature is maintained at 190° F. and the product is ready to be put into cans. This may be accomplished in a conventional filling machine, and is preferably brought about so that the mixture is maintained approximately at the temperature just stated. Any suitable type of cans may be used, but metal cans of well known form are preferred.

In order to avoid chemical reaction between the constituents of the scrapple and the metal of the cans, when such are used, the cans should be first coated with an enamel, that will be unaffected chemically by the constituents of the mixture. It has been found that an enamel including zinc oxide is very effective to prevent the formation of the black products of chemical reaction between the can and the constituents of the scrapple to which attention is above directed. However, any suitable coating of a siliceous nature that will protect the metallic walls of the can from the effect of the constituents of the scrapple is contemplated as coming within the scope of the present invention.

The scrapple, prepared as above indicated, is filled in the cans, and the cans are sealed in the usual manner, and inserted in a retort containing water at a temperature of approximately 240° F. so as to continue the cooking of the scrapple, in the cans at a temperature that will not result in the formation of excessive pressure within the can, but that will be effective to complete the cooking of the scrapple without loss of flavor due to the escape of vapors and volatile products of the cooking operation.

It has been found that this mode of completing the cooking of the scrapple in cans that have been treated in a manner so that no chemical reactions take place between the metal and the can and the constituents of the scrapple, results in a product having an improved and pleasing flavor.

The cooking of the scrapple in the cans is continued for a period of eighty or ninety minutes, after which the cans are removed from the retort and they are suddenly chilled by subjecting them to a suitably low temperature. Such chilling results in a condensation of the vapors in the can and the creation of a vacuum therein, which is effective to maintain the product in good condition for an indefinite period. The product is then ready for the market.

It will be seen that a novel process of canning scrapple is described, which process can be carried out expeditiously and will result in a canned product of very high grade and superior quality. It should be understood that the formula for the scrapple may be varied as may be desired, and that the gist of the invention resides in the completion of the cooking of the scrapple in sealed cans, particularly of the kind in which the walls have been protected so that they are unaffected by the cooking of the scrapple ingredients after the can has been sealed. As above pointed out the process results in retaining a substantial portion of the natural flavors of the ingredients, that would be lost by an open cooking of the scrapple ingredients in vented cans as heretofore proposed.

The invention has been above described in some detail. It should be understood, however, that the invention does not reside in any of said details, but that the scope thereof is to be determined from the following claims. What I claim as my invention is:

1. The process of canning scrapple in metal cans which consists in covering the inside of the can with a coating of enamel preventing direct contact of the scrapple with the metal walls of the can, filling the cans with partially cooked and thickened scrapple while hot, sealing the cans, subjecting the sealed cans to a temperature sufficiently high to continue the cooking of the scrapple in the sealed cans, and suddenly chilling the cans.

2. The process of canning scrapple which consists in partially cooking the scrapple to form a substantially homogeneous thickened mixture, filling the cans therewith, sealing the cans, and completing the cooking of the scrapple in the sealed cans at a temperature sufficient to cook the contents of the can.

3. The process of canning scrapple which consists in partially cooking the scrapple to drive off excess liquid and to form a substantially homogeneous mixture, filling the cans therewith, sealing the cans, completing the cooking of the scrapple in the sealed cans, and then suddenly chilling the cans.

4. The process of canning scrapple in metal cans, which consists in covering the inside of the cans with a coating of enamel preventing direct contact of the scrapple with the walls of the can, filling the cans with partially cooked and thickened scrapple, sealing the cans subjecting the sealed cans and to temperatures sufficiently high to continue the cooking of the scrapple in the sealed cans.

5. The process of canning scrapple in metal cans, which consists in selecting a can having its interior coated with an enamel protecting the metal from contact with the scrapple, cooking the constituents of the scrapple until the mass becomes homogeneous and begins to thicken, filling the cans with the thickened mass, completely sealing the cans, and then finishing the cooking of the scrapple in the sealed cans.

6. The process of canning scrapple which consists in cooking the vegetable and animal ingredients of the scrapple in water until a homogeneous thickened mixture is formed and a temperature of approximately 190° F. is attained, filling the mixture in cans while at said temperature, sealing the cans, completing the cooking of the mixture in the cans at a temperature of approximately 240° F., and suddenly chilling the cans to form a partial vacuum therein.

FREDERICK A. VOGT.